UNITED STATES PATENT OFFICE.

LEONHARD LEDERER, OF MUNICH, ASSIGNOR TO C. F. BOEHRINGER & SOEHNE, OF WALDHOF, NEAR MANNHEIM, GERMANY.

AMIDO-CROTONYLANILID AND PROCESS OF MAKING IT.

SPECIFICATION forming part of Letters Patent No. 503,748, dated August 22, 1893.

Application filed October 11, 1892. Serial No. 448,575. (Specimens.)

*To all whom it may concern:*

Be it known that I, LEONHARD LEDERER, a citizen of the German Empire, residing in the city of Munich, Kingdom of Bavaria, Germany, have invented certain new and useful Improvements in the Art of Preparing Derivatives of Amido-Crotonic Acids; and I do hereby declare the following to be a full, clear, and exact description of the invention, such as will enable others skilled in the art to which it appertains to make and use the same.

My invention relates to the preparation of a derivative of amido-crotonic-acid, which is employed in the preparation of acetyl-amido-crotonyl-anilid, which forms the subject-matter of another application for Letters Patent of the United States, filed by me on the 15th of April, 1892, Serial No. 430,568.

For this purpose my invention consists in the method, steps and features hereinafter set forth and claimed.

I prefer to prepare this compound by the following process:—

I add acetyl acetanilid ($C_{10}H_{11}NO_2$ or $C_6H_5.NH.C_2H_2O.C_2H_3$) alone or in solution, to an aqueous or alcoholic solution of ammonia in slight excess and let the same stand at the ordinary temperature. After the lapse of from twenty-four to thirty hours, a transposition takes place, water being separated and $NH_2$ combining with the aceto acetanilid, as expressed in the following equation:—

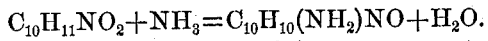
$$C_{10}H_{11}NO_2 + NH_3 = C_{10}H_{10}(NH_2)NO + H_2O.$$

The product so obtained is amido-crotonyl-anilid, which crystallizes out of the mixture and which is moderately soluble in most solvents in the cold and may be obtained pure by once crystallizing out of alcohol. It crystallizes in colorless needles having a melting point of 146° to 147° Celsius.

While I consider the above the best manner to carry out my invention, the same may be varied in many particulars without departing from the same. I do not therefore desire to be limited to the details thus set forth, but

What I claim, and desire to secure by Letters Patent, is—

1. The process which consists in treating acetyl-acetanilid with ammonia and allowing the mixture to stand until the amido crotonyl-anilid is formed, and then separating the resulting product, substantially as set forth.

2. As a new compound amido-crotonyl-anilid, having the formula $C_{10}H_{10}(NH_2)NO$, which is moderately soluble in most solvents in the cold and crystallizing in colorless needles and having a melting point of 146° to 147°, Celsius, substantially as set forth.

In testimony whereof I affix my signature in presence of two witnesses.

LEONHARD LEDERER.

Witnesses:
 FRITZ BAUKE,
 EMIL HENZEL.